United States Patent Office 3,483,237
Patented Dec. 9, 1969

3,483,237
POLYAMIDE COMPOSITIONS OF A POLYMERIC
FAT ACID AND A MIXTURE OF DIAMINES
Dwight E. Peerman and Leonard R. Vertnik, Minneapolis, Minn., assignors to General Mills, Inc., a corporation of Delaware
No Drawing. Filed Nov. 1, 1965, Ser. No. 505,991
Int. Cl. C09f 7/00
U.S. Cl. 260—404.5    10 Claims

ABSTRACT OF THE DISCLOSURE

There is disclosed improved polyamide compositions of polymeric fat acids and a diamine, the improvement comprising replacing a portion of the diamine component with the diamine of a polymeric fat acid, the polymeric fat acids havings a dimeric content greater than 85% by weight. Two distinct improved products are provided; one, at low levels of displacement, preferably about 3 equivalent percent and the second, at higher levels of displacement, about 10–30 equivalent percent. The products find particular utility in coatings and adhesives.

---

This invention relates to improved polyamide compositions and in particular, to polyamide resins of a polymeric fat acid and a diamine, improved by replacing a portion of the diamine component with a diamine of a dimeric fat acid. The invention also relates to a method of preparing such improved polyamide resins.

Polyamide resins can be prepared from polymeric fat acids and various diamines to provide products having a variety of distinct combinations of properties. Among the properties of primary interest in such polyamide resins are the ball and ring melting point, the combination of tensile-impact properties, elongation and tensile strength properties. Attempts to improve one or more of these properties in the product have generally been unsuccessful in that improvement in one property generally provides drastic adverse effects in the remaining properties. Of primary concern are the properties of melting point, tensile-impact and elongation, particularly the melting point and tensile-impact properties. It is generally desirable that in any modification of the product the melting point remains substantially unchanged, as the melting point is a very important property in most uses to which the polyamide product is put. In many uses, while adverse effects on other properties may be tolerated, such as in tensile strength, it is generally necessary that the melting point remain unchanged or not significantly changed.

It was unexpectedly discovered that the polyamide resins of various diamines and polymeric fat acids, particularly those having a dimeric fat acid content in excess of 85% by weight, could be prepared having improved properties, by the replacement or displacement of a portion of the diamine employed with the polymeric fat acid. It was found that this method of improving the product resulted in a product in which the melting point remains substantially unchanged and the tensile-impact properties are increased manyfold. In addition, the elongation is increased. This result is surprising in that the diamine of the polymeric fat acid would not be expected to provide any significant change in the product in view of the fact that this diamine contains the radical of a dimeric fat acid which is already present in the original product in the acid component. Unexpectedly, however, significant changes in the properties of the product are achieved.

It was further discovered that at least two distinct, improved products can be provided. With the displacement of relatively small amounts of the diamine of a polymeric fat acid, the tensile-impact property is greatly increased without significantly affecting any of the other properties of the original product. The preferred product at this low level of displacement is achieved at about 3 equivalent percent. At higher levels of displacement, the tensile-impact properties are even more greatly increased and the melting point remains virtually unchanged. With most products, this occurs at about 8 equivalent percent, up to about 75 equivalent percent displacement. The tensile-impact properties appear to be at a maximum at about a 10–30 equivalent percent displacement. At even higher levels of displacement, the tensile-impact properties decrease slightly and appear to substantially level off. However, the tensile-impact properties at this point are still larger than those achieved when no displacement is made. At the higher levels of addition, the melting point appears to remain substantially constant. At the higher levels of addition, there is a decrease in the tensile strength properties of the product. If such a decrease can be tolerated and high tensile-impact properties are desirable, the higher levels are employed. If the decrease cannot be tolerated, lower levels are employed. These effects on the properties of the products are best seen from the examples which are to follow herein.

The polyamide resins which are to be improved by the present invention are those prepared from polymeric fat acids and various diamines. The resins may include other copolymerizing acid components and the diamine employed may be a single diamine or a mixture of two different diamines. In addition, small amounts of monomeric, monofunctional acids may be present.

The copolymerizing acids generally employed may be aliphatic, cycloaliphatic or aromatic dicarboxylic acids. These acids may be defined ideally by the formula

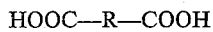

where R is an aliphatic, cycloaliphatic or aromatic hydrocarbon radical having from 2 to 20 carbon atoms. Illustrative of such acids are adipic, sebacic, suberic, succinic, glutaric, isophthalic, terephthalic and phthalic acids. In place of the acids themselves, the amide forming derivatives thereof may be employed, such as the chlorides or the alkyl and aryl esters thereof, such as the dimethyl, diethyl and diphenyl esters. Where the alkyl esters are employed generally, the alkyl group contains from 1 to 8 carbon atoms.

The diamines generally employed may be aliphatic, cycloaliphatic or aromatic diprimary diamines which may be ideally represented by the formula

where R' is an aliphatic, cycloaliphatic or aromatic hydrocarbon radical. Representative of such compounds are:

ethylene diamine
1,2-diamino propane
1,2-diamino butane
1,3-diamino propane
1,3-diamino butane
tetramethylene diamine
pentamethylene diamine
hexamethylene diamine
decamethylene diamine
cotadecamethylene diamine
metaxylylene diamine
paraxylylene diamine
cyclohexylene diamine
bis(aminoethyl) benzene
cyclohexyl bis(methyl amine)
diamino-dicyclohexyl methane
methylene dianiline The diamine may be employed alone or mixtures of two or more may be employed. The preferred diamines are the alkylene diamines in which the alkylene group has from 2–6 carbon atoms.

The term "polymeric fat acid" refers to a polymerized fat acid. The term "fat acid" as used herein refers to naturally occurring and synthetic monobasic aliphatic acids having hydrocarbon chains of 8 to 24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they are all generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include clays, di-t-butyl peroxide, boron trifluoride and other Lewis acids, anthraquinone, sulfur dioxide and the like. Suitable monomers include the branched and straight chain, poly and mono ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of of a catalyst. Acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful for the preparation of the polymeric fat acids. Suitable examples of such materials include 10-undecanoic acid, tariric acid, stearolic acid, behenolic acid and isamic acid.

Because of their ready availability and relative ease of polymerization, oleic acid and linoleic acid are the preferred starting materials for the preparation of the polymeric fat acids. Mixtures of these two acids are generally found in tall oil fatty acids which are, accordingly, the common source for polymerization to polymeric fat acids commercially available.

The polyamides with which this invention is concerned are those prepared from polymeric fat acids having a dimer acid content in excess of 85% by weight and preferably in excess of 90% by weight. This invention might also, however, have application to products where a lower dimeric fat acid content is employed but where, due to the unique nature of the specific diamine employed, the product has properties substantially the same as those prepared from polymeric fat acids having the higher dimeric fat acid contents mentioned above.

As earlier indicated, small amounts of monomeric monocarboxylic acids may be present. In the earlier discussion of polymeric fat acids, it was apparent that this is a mixture of monomeric, dimeric and trimeric or higher polymeric forms. Accordingly, there is generally present therein some monomeric monocarboxylic acids which contain from 8 to 22 carbon atoms. Other monocarboxylic acids might be present by addition, such as acetic acid, propionic acid and the like. In general, these acids are monomeric, aliphatic hydrocarbon, monocarboxylic acids having from 2 to 22 carbon atoms.

The polyamides are prepared by reacting the acid components with the diamine components at temperatures in the range of 100 to 300° C. with removal of the water of reaction (or the alcohol, if esters are employed). In general, at the beginning of the reaction it is desirable to use a temperature above 120° C. and preferably above 150° C. to 180° C., with the final temperature of reaction usually above 200° C., preferably about 250° C. Substantially equivalent amounts of the acid and amine components are employed. A relatively small excess of either the acidic reactant or the diamine reactant may be employed. A small excess of diamine will produce a product bearing amino groups at each end. Conversely a small excess of acidic reactant will produce a product bearing carboxyl groups at each end. If a relatively long product molecule is to be achieved, substantially equivalent amounts of reactants must be employed, however. This does not mean in practice that it will be necessary to have the amine and acidic reactants present in exactly equivalent amounts initially, as a portion of the excess diamine or acidic reactant may be eliminated by volatilization or otherwise during the course of the reaction but it is desirable that the ratio of the radicals derived from the amine components to the radicals derived from the acidic components are almost exactly equivalent in the final product. When copolymerizing acids are employed, they are generally employed up to an amount of a ratio of carboxyl groups of the polymeric fat acid to the carboxyl group of the copolymerizing acid (equivalents ratio of carboxyl groups) of 1:1, or up to 50 equivalent percent of the total carboxyl component.

The foregoing thus describes the polyamides, the properties of which are to be improved. This improvement is obtained by substituting for a portion of the diamine component the diamine of a dimeric fat acid. The preparation of the polyamide is then carried out as described hereinabove. This diamine, hereinafter referred to as "dimer diamine" or "dimeric fat diamine" is prepared from dimeric fat acids. Relatively pure dimeric fat acids, sometimes called dimerized fat acids, can be distilled from commercially available polymeric fat acids which, as indicated earlier, are a mixture of monomeric, dimeric, trimeric and higher polymeric forms. The relatively pure dimeric fat acids are reacted with ammonia to obtain the corresponding dinitrile which is then hydrogenated to the corresponding dimer diamine. Commercially available polymeric fat acids are generally prepared by polymerizing tall oil fatty acids, the tall oil fatty acids containing a mixture of oleic and linoleic acids. The dimer diamine employed herein is prepared from the dimeric fat acid fraction obtained by distillation of commercially available polymeric fat acids in the manner described below. It is understood, however, that diamines prepared from other polymeric fat acids may also be employed, the preferred products being prepared from polymeric fat acids prepared by polymerizing the 16 to 20 carbon atom monocarboxylic, aliphatic hydrocarbon acids, with the 18 carbon atom acids being the most common.

The dimeric fat acid is converted to the corresponding dinitrile by reacting the dimeric fat acid with ammonia under nitrile-forming conditions. The details of this reaction are set forth in Chapter 2 of "Fatty Acids and Their Derivatives" by A. W. Ralston, John Wiley and Sons, Inc., New York (1948). The dinitrile is then purified by vacuum distillation or other suitable means. After such purification, the dinitrile is then hydrogenated to form the corresponding diamine which is also purified by vacuum distillation or other suitable means. It is essential that the diamine be of high purity in order to obtain the linear polymers of high molecular weight of the present invention. For purposes of convenience, only one dimer diamine was employed in the examples to follow, which is the dimer diamine prepared from the dimeric fat acid fraction obtained from polymerized tall oil fatty acids.

Ideally this dimer diamine may be represented by the formula $$H_2NR'''NH_2$$

where $R'''$ is the dimeric fat radical of a polymerized fat acid, said fat acid being a monocarboxylic, aliphatic acid having hydrocarbon chains of from 8 to 24 carbon atoms.

As indicated hereinabove, the improvement results from the replacement of the dimer diamine for a portion of the diamine component of the polyamide resin to be improved. This dimer diamine is substituted for from 0.5 to 75 equivalent percent of the diamine component. At the lower levels of replacement, the improved product will possess greatly improved tensile-impact properties, improved elongation with no significant adverse effect on the other properties such as melting point, tensile strength or tensile shear. At higher levels of addition, the tensile-impact properties are even more greatly improved, the elongation is increased, and the melting point remains substantially constant as compared with the melting point of lower levels of substitution. With these higher levels of displacement, however, there is some decrease in the tensile strength and tensile shear properties. As these polyamide resins are useful in areas where lower tensile strength or tensile shear properties can be tolerated, the improvements in the other properties represent a distinct useful improvement and, of course, if retention of these properties is necessary for the particular use, only the lower levels of substitution need be employed which still provides for significant increase in tensile-impact and elongation.

The breakpoint between the levels of displacement cannot be exactly defined generically, as this will depend to some extent on the particular other diamine or copolymerizing acid employed. For any specific resin composition, this point is readily apparent as the change in tensile impact-properties at some level of substitution will increase quite drastically, eventually reaching a maximum and then decreasing somewhat to a leveling point over a wide range. This can be determined quite readily by conducting a few runs with a specific composition, varying only the level of displacement and plotting graphically the tensile-impact property, and other properties if desired, against level of substitution. In general, this break point will occur at levels of addition in the range of about 5 to 10 amine-equivalent percent, with the maximum tensile-impact value being reached in the range of about 15 to 35 equivalent percent with a gradual leveling off. In the lower level, up to 5 or 10 equivalent percent substitution, the tensile shear and tensile strength properties are not significantly affected. The elongation continues to increase as the level of displacement is increased. With regard to melting point, there may be some lowering thereof initially at the lower levels, which is, however, not significant, with a leveling of the value as the level of displacement is increased up to about 50 to 75 equivalent percent displacement. After about 75 equivalent percent displacement, the melting point is drastically reduced as the level of displacement is increased. This can readily be seen in the examples to follow which best illustrate the invention.

EXAMPLE I

Preparation of dimer diamine

The dimer diamine employed in the preparation of the polyamides of this invention was prepared by sparging polymerized tall oil fatty acids with ammonia at 300° C., at a pressure of 10–20 p.s.i. for about 3½ hours using 0.1% zinc oxide catalyst. The resulting nitrile product had an acid number of 0.7 and analyzed at 92.0% nitrile by weight. The percent monomeric nitrile was 1.3, the percent dimeric nitrile was 64.0 and percent trimeric (and higher polymeric) nitrile was 24.0%. The percent unsaponifiables (unsap.) was 1.3 and the Gardner Color was 11–12. After distillation, the product analyzed as follows:

| | |
|---|---|
| Acid No. | 0.4 |
| Percent unsap. | 0.8 |
| Percent monomeric nitrile | 1.1 |
| Percent dimeric nitrile | 89.4 |
| Percent trimeric nitrile | 9.1 |

This nitrile product was hydrogenated using three additions of Raney nickel at 2% each addition. The temperature was maintained near 150° C. at 380–400 p.s.i. hydrogen pressure for about 11½ hours. The resulting diamine had the following analysis:

| | |
|---|---|
| Amine No. | 184.8 |
| Percent primary amine | 85.3 |
| Percent secondary amine | 10.2 |
| Percent secondary and tertiary amine | 10.6 |
| Gardner Color | 8–9 |
| Iodine value (I.V.) | 94.3 |

After distillation, the product had the following analysis:

| | |
|---|---|
| Amine No. (total) | 204.7 |
| Percent secondary and tertiary amine | 0.5 |
| Percent monomeric amine | 0.3 |
| Percent dimeric amine | 97.1 |
| Percent trimeric amine | 2.6 |
| Gardner Color | 4–5 |

EXAMPLE II

Preparation of polyamide resin

Into a reactor equipped with a thermometer, stirrer and distillation head were placed all of the reactants. The contents were agitated and heated over a two-hour period to 240° C. The temperature was maintained at 240° C. for two hours under a sweep of nitrogen gas and for an additional two hours at 240° C. under vacuum (water aspirator). The product was then poured out and allowed to cool.

Several preparations were made with varying levels of replacement of the dimer diamine of Example I, including for comparison a product with 0% replacement and one at 100% replacement. The polymeric fat acids employed were commercially available distilled products having the following analysis:

| | |
|---|---|
| Weight percent monomer (M)[1] | 2.4 |
| Weight percent intermediate (I)[1] | 2.8 |
| Weight percent dimer (D)[1] | 91.4 |
| Weight percent trimer (T)[1] | 3.4 |
| Acid value (A.V.) | 188 |
| Saponification value (S.V.) | 199 |

[1] By gas liquid chromatography.

As a copolymerizing acid, there was employed sebacic acid. The equivalent ratio of polymeric fat acid to sebacic acid was 1:0.45. As the diamine, there was employed ethylene diamine, portions of which were replaced with the dimer diamine of Example I. A ration of amine to acid equivalents of 0.98 was employed.

After preparation of the products, a number of the properties were measured. The results of these preparations can be seen from the following Table I in which the various properties studied were determined as follows:

TABLE I

| Example | Equivalents Dimer Diamine, percent | Amine No. | Acid No. | Viscosity, Poises 240° C. | B&R melting point, ° C. | Tensile impact, ft.-lbs./in.² | Room Temperature (R.T.) | | | Tensile Shear | | | |
|---|---|---|---|---|---|---|---|---|---|---|---|---|---|
| | | | | | | | Tensile strength, p.s.i. | Yield point, p.s.i. | Elongation, percent | Aluminum | | Steel | |
| | | | | | | | | | | R.T. | 170° F. | R.T. | 170° F. |
| II-A* | 0 | 2.2 | 4.6 | 46.5 (235° C.) | 206 | 0.2 | 3,252 | 2,460 | 326 | 1,697 | 830 | 1,749 | 790 |
| B | 1 | 2.5 | 3.7 | 50 | 194 | 6.1 | 3,532 | 1,982 | 480 | 2,151 | 771 | 1,719 | 661 |
| C | 3 | 2.7 | 3.9 | 44.5 | 196 | 7.6 | 3,364 | 1,830 | 492 | 1,745 | 788 | 1,719 | 764 |
| D | 5 | 1.8 | 4.3 | 48 | 194 | 12.4 | 3,095 | 1,438 | 509 | 1,692 | 617 | 931 | 700 |
| E | 7.5 | 1.9 | 4.0 | 56 | 194 | 13.2 | 2,887 | 1,313 | 548 | 1,735 | 661 | 1,182 | 461 |
| F | 10 | 1.8 | 3.8 | 60 | 192 | 342 | 2,373 | 1,188 | 490 | 1,718 | 550 | 1,508 | 503 |
| G | 20 | 1.4 | 3.7 | 82.5 | 180 | 383 | 1,958 | 830 | 617 | 1,511 | 403 | 1,362 | 411 |
| H | 75 | 1.1 | 3.7 | 91 | 175 | 294 | 37 | 37 | >1,600 | Not determined | | | |
| I* | 100 | 0.3 | 7.0 | 37 | 96 | 284 | 6.4 | 6.4 | >1,200 | Not determined | | | |

*Comparison run.

The tensile strength and elongation were measured using an Instron Tensile Tester Model TTC using ASTM D1708–59T.

The polymer is compression molded as a 6″ x 6″ sheet of approximately 0.04 inch thickness, at a temperature near its melting point (usually a few degrees lower than the melting point) and at 40,000 lbs. load or higher using cellophane as the parting agent in the mold. From this sheet, test specimens are die-cut to conform to ASTM 1708–59T.

The test specimen is clamped in the jaws of the Instron. Crosshead speed is usually 0.5 inch/minute at 100 pound full scale load. Chart speed is 0.5 inch/minute. Tensile strength (reference: ASTM D638–52T) is calculated as:

$$\text{Tensile strength} = \frac{\text{maximum load in pounds}}{\text{cross sectional area (sq. in.)}}$$

Percent elongation is calculated as:

Percent elongation =
$$\frac{\text{gage length at break} - \text{gage length at 0 load}}{\text{gage length at 0 load}} \times 100$$

In addition to tensile strength and elongation, the following properties were measured:

(1) Ball and ring softening point (B&R)—ASTM E28–58T.

(2) Amine and acid No. —Conventional analytical titration procedure. The results are expressed as milligrams of KOH equivalent to amine or acid present per gram of sample.

(3) Viscosity—by Brookfield viscosimeter.

(4) Yield point—ASTM D1708–59T.

(5) Tensile shear (on aluminum and steel)—Mil–A–5090D and ASTM D1002–64.

(6) Tensile-impact—ASTM D1822–61T. (L specimen.)

It is apparent from the foregoing that for this specific composition, after a slight initial drop in the melting point, the melting point then remains substantially constant until the level of displacement of the dimer diamine exceeds 75 equivalent percent. A dramatic improvement is apparent in the tensile-impact property when the displacement of 1 equivalent percent of dimer diamine resulted in an increase from 0.2 to 6.1. This improvement is a gradual improvement up to about 7.5 equivalent percent displacement, after which level an unexpected further increase is obtained, the value at the 7.5% level being 13.2 and rising to 342 at the 10% level. This value rises to a maximum at about the 20% to 30% level and then gradually decreases to a value which is still many times the initial value of 0.2. The elongation increases as the level of displacement increases.

For this specific composition, the replacement of the dimer diamine at the lower levels, up to about 7.5 equivalent percent, and preferably at about 3.0%, unexpected improvement is found in the tensile-impact property while the other properties remain substantially intact. At higher levels of displacement, even more unexpected improvement is found in tensile-impact although the tensile strength, yield point and tensile shear properties become more adversely affected as the level of displacement is increased. However, the melting point remains substantially constant at these higher levels of substitution and the elongation continues to improve. At above the 75° equivalent percent replacement, the melting point is seriously affected along with the remaining properties.

For this specific polyamide resin composition, at the lower levels of displacement where adverse effects in other properties cannot be tolerated, the optimum level of substitution is at about 3.0 equivalent percent. In general, from 1 to 5 equivalent percent displacement is most desirable. At the higher levels of displacement, the desirable range is from about 8 to 50 equivalent percent, with about 15 to 40% being preferred, the optimum tensile strength being reached at a level of about 25 equivalent percent.

The foregoing represents a detailed summary with regard to one polyamide resin composition. With other polyamide resin compositions, the optimum and preferred points will vary somewhat dependent on the particular diamine component and particular copolymerizing acid, if any, which are employed. However, a similar relationship appears to apply in cases of polyamide resins employing a polymeric fat acid having a dimeric fat acid content in excess of 85% by weight, and preferably in excess of 90% by weight and substantially equivalent amounts of amine and acid components.

The specific properties of the original polyamide to be improved will, of course, vary, dependent on the particular diamine or copolymerizing acid present, if any. In general, copolymerizing acids when present, provide a higher melting point than if absent. However, a similar relationship on the effect on the properties of the original polyamide exists when varying levels of dimer diamine are substituted for a portion of the diamine component. If copolymerizing acid is absent as in the homopolymer of the polymeric fat acid and ethylene diamine, in general the melting point of the initial polyamide will be much lower, on the order of about 100° C. With the replacement with the dimer diamine for a portion of the ethylene diamine, the melting point again remains substantially unchanged and the tensile-impact properties and the elongation are improved in the same manner as noted above when a copolymerizing acid is employed.

The relationship resulting when a polyamide having no copolymerizing acid present is illustrated by the following:

EXAMPLE III

The polyamide products were prepared following the same procedure as Example II, except that the temperature was 250° C. for about 4 hours unless otherwise indicated, the last hour or two being under vacuum. Several preparations were made with varying levels of displacement of the dimer diamine employed in Example I. The polymeric fat acids (polymerized tall oil fatty acids) employed were as follows.

Polymeric fat acid:
    Percent M[1] _____ 0.6
    Percent I[1] _____ 2.1
    Percent D[1] _____ 95.2
    Percent T[1] _____ 2.4
    Acid value _____ 194.9
    Saponification value _____ 199.2

[1] By gas liquid chromatography.

The results can be seen from the following Table II:

TABLE II

| Example | Ethylene Diamine | Dimer Diamine | Visc. 205° C., Poises | Amine No. | Acid No. | B&R melt. pt., °C. | Tensile str., p.s.i. | Elongation, percent | Tensile impact, ft.-lbs./in.$^2$ |
|---|---|---|---|---|---|---|---|---|---|
| III-A | 100 | 0 | 164 | 2.2 | 2.6 | 116 | 2,480 | 529 | 3.37 |
| B | 95 | 5 | 113 | 3.3 | 2.4 | 111 | 2,479 | 629 | 4.96 |
| C | 80 | 20 | 127 | 4.5 | 1.3 | 112 | 1,177 | 813 | 341 |
| D | 50 | 50 | 315 | 1.9 | 2.0 | 111 | 249 | 2,254 | 396 |

In the same manner, this effect of substituting various amounts of dimer diamine for other diamines in the polyamide composition can be seen when such other diamines are as follows:

1,2-diamino propane
1,3-diamino propane
1,2-diamino butane
1,3-diamino butane
hexamethylene diamine
octadecamethylene diamine
cyclohexylene diamine
bis (amino ethyl) benzene
cyclohexyl bis (methyl amine)
methylene diamine
diamino-dicyclohexyl methene Similar relationships are found in the presence of a copolymerizing acid in any of the above polyamides, when such other acids are as follows:

adipic acid
sebacic acid
suberic acid
succinic acid
glutaric acid
phthalic acid
isophthalic acid
terephthalic acid In addition to the other properties discussed above, it was found that the adhesive peel strength properties of the products are unexpectedly improved with the substitution of dimer diamine for a portion of the diamine component of the polyamide resin. This can be seen in the following Table III, which shows the tear burst values for some of the products of Examples II and III above.

The adhesive is tested by applying it between two strips of 0.005 inch cold rolled steel, one inch wide for a length of one inch. This is done by applying the adhesive to one strip and heat sealing the two strips together to provide the adhesive bond. The adhesive thickness layer is about 0.003 to 0.005 inch. The two uncemented ends are then drawn over a pleurality of ½ inch ball bearing rollers suspended in a jig which is suspended in an Instron Tester. The ends of the strips are then pulled over the rollers in the tester at the rate of one inch per minute. The adhesive peel value in pounds per inch of strip width is the average of five determinations.

TABLE III

| Example: | Adhesive peel strength (lbs./in.) |
|---|---|
| II-A | 3 |
| II-D | 6 |
| II-G | 18 |
| III-A | <1 |
| III-B | 1.9 |
| III-C | 17.3 |
| III-D | 62.0 |

The polyamide resin products of this invention find utility as coatings and particularly as adhesives. Because of the instant-setting adhesive qualities and the great bonding strength, flexibility, toughness and impact resistance, the products find application in industries such as shoemaking, construction, automotive, appliances, canning, packaging, pipe and sheet metal, electrical, electronics and furniture production. They are of particular interest in the manufacture of adhesive-lasted shoes. The molten resins will join the two pieces of similar or dissimilar materials such as cloth to wood, glass to metal, nylon to rubber, wood to wood, metal to metal and metal to wood almost instantly upon slight cooling.

The embodiments of the invention in which an exclusive property of privilege is claimed are defined as follows:

1. A polyamide composition consisting of the amidification product at temperatures in the range of 100–300° C. of (A) a polymer fat acid having a dimeric fat acid content of greater than 85% by weight,
(B) from 0 to 50 equivalent percent of the total carboxyl component of a copolymerizing acid of the formula $$HOOC—R—COOH$$

where R is selected from the group consisting of aliphatic, cycloaliphatic and aromatic hydrocarbon radicals having from 2 to 20 carbon atoms,
(C) a mixture of diamines, one of said diamines being a diprimary diamine of the formula $$H_2NR'''NH_2$$

where R''' is the dimeric fat radical of a polymerized fat acid, said fat acid being a monocarboxylic, aliphatic acid having a hydrocarbon chain of from 8 to 24 carbon atoms and said diprimary diamine being employed in an amount of from about 0.5 to 75 equivalent percent of the total diamine component, the other diamines in said mixture having the formula $$H_2N—R'—NH_2$$

where R' is selected from the group consisting of alkylene, cycloalkylene and aromatic hydrocarbon radicals having from 2–20 carbon atoms, the equivalents of total carboxyl component being substantially equal to the equivalents of total amine component.

2. A polyamide composition as defined in claim 1, in which said polymeric fat acid is a polymerized tall oil fatty acid, R''' is the dimeric fat radical of a polymerized tall oil fatty acid, said copolymerizing acid is sebacic acid, and the other diamine in said mixture is ethylene diamine.

3. A polyamide as defined in claim 2 in which said diprimary diamine is employed in an amount of 1 equivalent percent of the total diamine component, said sebacic acid is employed in an amount of 31 equivalent percent of the total carboxyl equivalent.

4. A polyamide as defined in claim 2 in which said diprimary diamine is employed in an amount of 3 equivalent percent of the total diamine component, said sebacic acid is employed in an amount of 31 equivalent percent of the total carboxyl equivalent.

5. A polyamide as defined in claim 2 in which said diprimary diamine is employed in an amount of about 25 equivalent percent of the total diamine component, said sebacic acid is employed in an amount of 31 equivalent percent of the total carboxyl equivalent.

6. A polyamide composition as defined in claim 1, in which said polymeric fat acid is a polymerized tall oil fatty acid, R''' is the dimeric fat radical of a polymerized tall oil fatty acid, said copolymerizing acid is absent and the other diamine in said mixture is ethylene diamine.

7. A polyamide as defined in claim 6, in which said diprimary diamine is employed in an amount of from 20 to 30 equivalent percent of the total diamines.

8. A polyamide as defined in claim 6 in which said diprimary diamine is employed in an amount of 25 equivalent percent of the total diamine component.

9. A polyamide composition as defined in claim 3 in which said polymeric fat acid is a polymerized tall oil fatty acid and R''' is a dimeric fat radical of a polymerized tall oil fatty acid.

10. A polyamide composition as defined in claim 9 in which R' is an alkylene group having from 2 to 6 carbon atoms.

References Cited

UNITED STATES PATENTS

| 2,450,940 | 10/1948 | Cowan et al. | 260—404.5 |
| 3,242,141 | 3/1966 | Vertnik et al. | 260—78 |
| 3,249,629 | 5/1966 | Rogier | 260—404.5 |

OTHER REFERENCES

Emery Technical Bulletin, No. 418, 7 pages, August 1960.

ALEX MAZEL, Primary Examiner

R. V. RUSH, Assistant Examiner

U.S. Cl. X.R.

106—243; 260—78

PO-1050
(5/69)

UNITED STATES PATENT OFFICE
CERTIFICATE OF CORRECTION

Patent No. 3,483,237           Dated December 9, 1969

Inventor(s) Dwight E. Peerman and Leonard R. Vertnik

It is certified that error appears in the above-identified patent and that said Letters Patent are hereby corrected as shown below:

Column 1, line 17, delete "havings" and insert -- having --.

line 57, before "polymeric" insert -- diamine of a -

Column 2, line 62, delete "cotadecamethylene" and insert -- octadecamethylene --.

Column 3, line 40, after "elaidic" insert -- acid --.

Column 6, line 70, delete "ration" and insert -- ratio --.

Column 10, line 28, delete "polymer" and insert -- polymeric -

Column 11, line 15, delete "claim 3" and insert -- claim 1 --.

SIGNED AND
SEALED

JUN 16 1970

(SEAL)
Attest:

Edward M. Fletcher, Jr.
Attesting Officer

WILLIAM E. SCHUYLER,
Commissioner of Pate